(12) United States Patent
Matheson et al.

(10) Patent No.: US 7,128,780 B2
(45) Date of Patent: Oct. 31, 2006

(54) PROCESS FOR PRODUCING BUILDING MATERIALS FROM RAW PAINT SLUDGE

(75) Inventors: Robert R. Matheson, West Bloomfield, MI (US); Dennis M. Dixon, Flint, MI (US); John R. Moore, Leonard, MI (US); David A. Fischer, Rochester, MI (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/264,005

(22) Filed: Oct. 3, 2002

(65) Prior Publication Data

US 2003/0084824 A1 May 8, 2003

Related U.S. Application Data

(60) Provisional application No. 60/327,337, filed on Oct. 5, 2001.

(51) Int. Cl.
*C04B 18/04* (2006.01)
*C08L 95/00* (2006.01)

(52) U.S. Cl. ........... 106/697; 106/277; 106/281.1; 106/712; 106/724; 106/776; 106/778; 106/802; 106/823; 524/4; 588/252; 588/255; 588/256

(58) Field of Classification Search ........... 106/277, 106/281.1, 697, 712, 724, 776, 778, 802, 106/823; 524/4; 588/252, 255, 256
See application file for complete search history.

(56) References Cited

U.S. PATENT DOCUMENTS

| | | | |
|---|---|---|---|
| 3,837,872 A | 9/1974 | Conner | |
| 4,012,320 A | 3/1977 | Conner et al. | |
| 4,081,285 A | 3/1978 | Pennell | |
| 4,149,968 A | 4/1979 | Kupiec et al. | |
| 4,304,674 A | 12/1981 | Lazovsky et al. | |
| 4,656,059 A | 4/1987 | Mizuno et al. | |
| 4,814,092 A | 3/1989 | Patzelt | |
| 4,919,691 A | 4/1990 | Patzelt et al. | |
| 4,980,030 A * | 12/1990 | Johnson et al. | 203/4 |
| 5,004,550 A | 4/1991 | Beckman et al. | |
| 5,087,375 A | 2/1992 | Weinwurm | |
| 5,129,995 A | 7/1992 | Agarwal | |
| 5,198,018 A | 3/1993 | Agarwal | |
| 5,489,333 A | 2/1996 | Soroushian et al. | |
| 5,490,907 A | 2/1996 | Weinwurm et al. | |
| 5,547,504 A | 8/1996 | Soroushian | |
| 5,562,590 A * | 10/1996 | Caza | 588/257 |
| 5,573,587 A | 11/1996 | St. Louis | |
| 5,765,293 A * | 6/1998 | St. Louis et al. | 34/305 |
| 5,880,218 A | 3/1999 | Gerace et al. | |
| 5,922,834 A * | 7/1999 | Gerace et al. | 528/492 |
| 5,954,970 A * | 9/1999 | St. Louis | 210/710 |
| 5,980,592 A | 11/1999 | S.o slashed.gaard | |
| 6,084,003 A | 7/2000 | Kurple | |
| 6,180,023 B1 | 1/2001 | Amer | |
| 6,455,598 B1 * | 9/2002 | Gerace et al. | 521/41 |
| 2003/0213412 A1 * | 11/2003 | Drew | 106/712 |

FOREIGN PATENT DOCUMENTS

| | | |
|---|---|---|
| DE | 30 00 485 A1 | 7/1981 |
| EP | 000710632 A1 * | 5/1996 |
| EP | 866 038 A1 | 9/1998 |
| JP | 53-94263 A * | 8/1978 |

OTHER PUBLICATIONS

Joo-Hwa Tay, Reclamation of watewater and sludge from concrete making, Resources Conservation and Recycling, (1989), pp. 211-227, vol. 2-3, Elsevier Science Publisher, Amsterdam, NL, no month.
XP000194159 Chemical Abstracts, vol. 115, No. 8, (1991), Columbus, OH, no month.
International Search Report (PCT/US02/33230) dated Mar. 21, 2003.

* cited by examiner

*Primary Examiner*—Anthony J. Green
(74) *Attorney, Agent, or Firm*—Chyrrea J. Sebree

(57) ABSTRACT

A process for producing building materials, such as asphalt, cement, concrete, mortar, or plaster board from liquid paint sludge containing water and paint solids produced from overspray in commercial paint booth operations. The preferred embodiment comprises adding the liquid paint sludge as the hydrating agent directly to the building material mix.

13 Claims, 2 Drawing Sheets

PROCESS FOR PRODUCING BUILDING MATERIALS FROM RAW PAINT SLUDGE

CROSS-REFERENCE TO RELATED APPLICATION

This application claims priority under 35 U.S.C. §119 from U.S. Provisional Application Ser. No. 60/327,337 (filed Oct. 5, 2001), which is incorporated by reference herein as if fully set forth.

BACKGROUND OF THE INVENTION

This invention relates generally to a process for producing building materials from paint sludge and in particular to a process for using raw paint sludge from paint booth operations in the manufacture of building materials such as asphalt, cement, concrete, mortar, and plaster.

Paint sludge poses a serious and expensive disposal problem for painting operations in manufacturing plants. When an object such as an automobile is painted in a booth, the excess paint is collected in a water curtain or in a water stream underneath floor grates beneath the paint booth. This material is known as paint sludge. Disposal of paint sludge is a problem of considerable complexity that faces paint booth operators. Currently available disposal technology is based upon the principles of incineration, chemical and physical treatment, and solidification. The resulting end product of such technology is typically used as landfill. However, the use of paint sludge for landfill has its limitations because of concerns for potential environmental hazards and the cost of special precautions needed to handle such waste materials.

There have been many attempts to use paint sludge for creating various useful byproducts rather than to dispose of it, in order to gain some value thus lowering the cost. All of these efforts involved processing, in most cases to dry powder, which resulted in cost penalties that severely limited commercial interest. For example, Soroushian et al U.S. Pat. No. 5,489,333 issued Feb. 6, 1996 suggests the use of dried paint sludge powder as a filler admixed in Portland Cement. St. Louis U.S. Pat. No. 5,573,587 issued Nov. 12, 1996 teaches mixing raw paint sludge with quicklime (CaO) to chemically dry the sludge, creating a powder of paint solids and slaked lime suitable as a component for use in mortar, cement, concrete and asphalt.

Processing of paint sludge is time consuming and costly. Accordingly, there is need for a simple process that effectively uses all of the paint sludge solids generated by a paint booth facility.

None of the forgoing references suggest using liquid paint sludge directly as a component in concrete and cement type building materials.

SUMMARY OF THE INVENTION

The present invention provides a process for directly using liquid paint sludge containing water and paint solids produced from paint booth operations as an integral component in the production of cement and concrete type building materials, while providing an efficient method for the recycling of paint sludge. The present invention saves processing time and comprises very few steps, and avoids the need for extensive processing and sludge treatment.

The process of the present invention for using the paint sludge and producing building materials therefrom comprises:

(a) mixing the liquid paint sludge with one or more materials used to produce building materials, such as cement mix or concrete mix or portions thereof; and (b) allowing the mixture to cure, thereby producing a building material therefrom.

The benefit of this invention is that paint sludge is used as the hydrating material in the building material. Preferably, the paint sludge is the sole source of hydrating material. Optionally, however, additional water can be added to provide the water to building material ratio desired.

Building materials prepared by the forgoing process are also a part of this invention.

DETAILED DESCRIPTION OF THE INVENTION

Figure 1:
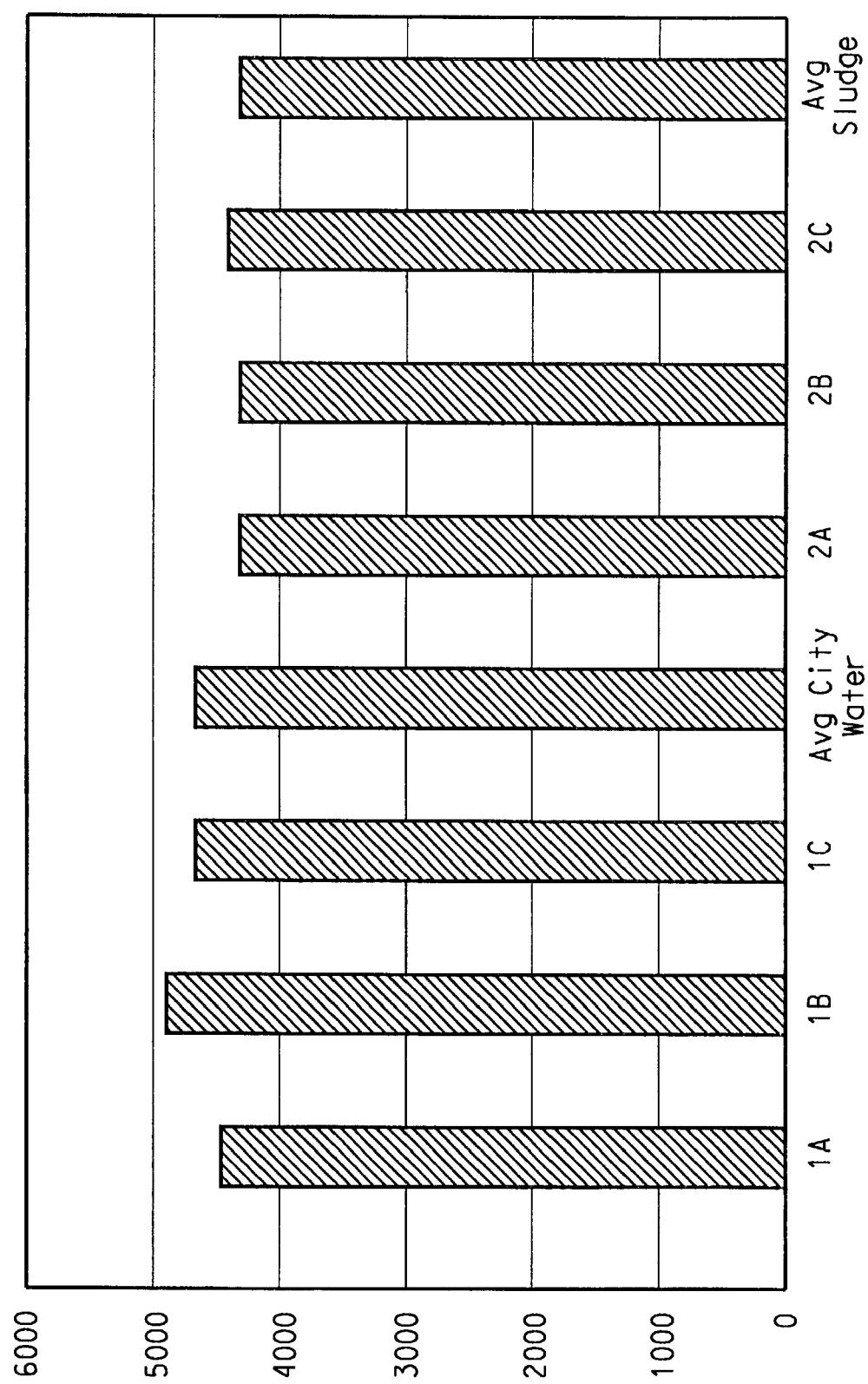
FIG. 1 is a plot showing a comparison of compressive strength of cement made with paint sludge and cement made with city water.

The term "liquid paint sludge" as used herein means raw unprocessed paint sludge or possibly only moderately concentrated or moderately diluted paint sludge generated from paint booth operations.

It will be appreciated by those skilled in the art that waste paint sludge treated in accordance with the present invention is a complex material and is different from most other waste sludge. Such sludge typically includes volatile organic compounds ("VOC's"), such as thinner and solvents, uncured polymeric paint resins that can "cure," that is cross-link, crosslinkers, and inorganic and organic pigments. The invention is particularly directed to using raw paint sludge generated from automotive body or component spray painting operations.

Paint sludge is typically produced from overspray from spray painting an object such as an automobile in a paint booth and from other waste streams. Overspray paint sludge, in particular, is collected in troughs beneath the paint booth containing circulating water. This liquid sludge generally includes components captured from the application of various automotive finishes, such as primers, pigmented basecoats and clearcoats, each of which can be water borne or solvent borne finishes. Liquid paint sludge therefore consists of water, collected paint and booth chemicals, which serve to disperse the paint particles in the water stream.

Raw paint sludge from paint booth operations typically contains approximately 50% by weight of paint and 50% by weight of water. The present invention, however, can include the treatment of paint sludge having anywhere from approximately 5% to almost 80% by weight of paint, preferably 20% to 60% by weight of paint. Paint sludge mixtures having significantly less than 20% by weight of paint could be concentrated by removing water. Paint sludge mixture having too high a concentration of paint solids could be reconstituted with a sufficient amount of water to form a pumpable or pourable fluid and have sufficient water to be capable of completely reacting with the cement mix or concrete mix.

In the preferred embodiment of the present invention, liquid paint sludge is transported from the paint booth and used directly as the liquid hydrating component in preparing cement or concrete or other building materials. The invention generally comprises mixing the raw liquid paint sludge with one or more materials that are used to produce building materials, including asphalt, cement, concrete, mortar, or plaster board. Preferably, the paint sludge is the only hydrating agent used in the process. Optionally, however, additional water can be added to provide the desired water to building material ratio.

Examples of well known basic building material ingredients that can be mixed with the paint sludge include Portland cement, cement mix, mortar mix, concrete mix, plaster mix, and the like.

Portland cement, for instance, is a basic ingredient of concrete. It is made up of a controlled chemical combination of calcium, silicon, aluminum, iron and small amounts of other ingredients to which gypsum is added in the final grinding process to regulate the setting time of the cement. Lime and silica make up about 85% of the mass. Common among the materials used in its manufacture are limestone, shells, and chalk or marl combined with shale, clay, slate or blast furnace slag, silica sand, and iron ore. These materials are coarsely crushed, heated to above 1400° C. to convert calcium carbonate present to calcium oxide and calcium silicate and then ground to produce a fine gray powder. Hydration or addition of water, to Portland cement converts the calcium oxide to calcium hydroxide which is the active curing material in concrete through its reaction with carbon dioxide to produce calcium carbonate. It has been found in the present invention that paint sludge can be used as the principal source of water for Portland cement, and preferably as the only source.

Cement mix is a dry blend of quicklime and sand which is used as a building material. Quicklime is chemically known as calcium oxide and is produced by heating limestone or equivalent material above 1400° C. Addition of water hydrates the calcium oxide and yields a material that is formable and cures to a hard durable surface. In the present invention, paint sludge can be used as the principal source of water for cement mix, and preferably as the only source.

Mortar mix is a dry blend of Portland cement and sand. Water is added to the mix to produce a trowelable material that is used to bond preformed building materials such as brick and concrete blocks. Mortar also seals the structure against moisture and air penetration. The most important qualities of mortar are bond strength and durability. In yet another embodiment of the present invention, paint sludge can be used as the principal source of water for mortar mix, and preferably as the only source.

Concrete mix is a dry blend of Portland cement, sand and aggregate such as gravel or crushed stone. Water is added to the dry mix to form a workable building material. Paint sludge can be used as the principal source of water for concrete mix, and preferably as the only source in concrete as well. Concrete can be used to manufacture preformed building material such as concrete block or pre-stressed concrete, or used in fluid form to fill forms or molds.

Plaster mix is the dry form of calcined gypsum rock. The chemical composition of gypsum is $CaSO_4\text{-}2H_2O$—calcium sulfate dihydrate which when heated above 100° C. loses water of hydration to give calcium sulfate hemi-hydrate, commonly called Plaster of Paris, which after further processing is suitable for use in commercial applications. In use, water is added to the plaster mix to form a paste which can be worked or troweled. Paint sludge can be used as the principal source of water for plaster mix, and preferably as the only source. A principal use of plaster is to make plasterboard, a pre-formed building material.

Asphalt is the material left in the oil refinery process after other ingredients (gasoline, kerosene, oil, etc.) have been removed. This material is blended with aggregate and mineral filler to produce building material suitable for such uses as paving and roofing. Asphalt can be used in hot form or converted to an emulsified form with a slurry consistency where cold application is desired. Paint sludge can be used as the principal source of water for formation of emulsion asphalt, and preferably as the only source. Paint sludge contains emulsifiers that may reduce or eliminate the need for additional emulsifiers.

Building materials of very high quality are produced by the method of this invention.

Other beneficial qualities resulting from this invention are described below.

Building materials produced by the forgoing method can lessen the amount of added plasticizers, air entrainment agents, and similar chemicals commonly employed in the production of chemical admixtures for building materials intended for special purposes.

The exothermic heat of hydration reactions which accompany the curing of cement based products must often be taken into consideration, as for example within very massive structures. The present invention introduces novel components into the curing mixture that may moderate the rate of hydration and thus the exotherm.

The usable temperature range for pouring cement or concrete and other cement based compositions is ordinarily set by the conditions dictated by the environment during construction. The time to achieve both workable properties and ulitmate properties is an important factor. This invention may particularly extend the workability below the freezing point of water.

Although paint sludge is quite fluid, it beneficially has a viscosity higher than water may result in easier mixing of the cement or concrete mix. ASTM D-2196 specifying the Brookfield instrument is typically used to determine viscosity. While the desired viscosity will vary with the selected components, viscosity generally will be in the range of 2 to 500 centipoise, preferably 2 to 100 centipoise, to achieve improved mixing.

Paint sludge materials are gray or dark in color and so result in a final product perhaps slightly darker in color compared to traditional building materials that use water for hydration. In most applications, this difference is not significant but may serve as useful means of identification.

In summary, the main advantage of this invention is that it teaches the use of paint sludge directly as the hydrating source, preferably the only source of hydration, in the building material, which avoids the need for extensive prior processing of the paint sludge and conversion into powder before it is used to produce building materials.

The following example illustrates the invention. All parts and percentages are on a weight basis unless otherwise indicated.

EXAMPLES

The following building materials, one using paint sludge and one using city water, were prepared, molded into cylinders, and then the properties of these compositions were compared.

Example 1

Comparative Example

A full bag (32.3 kg) of Sakrete™ concrete mix was added to an electric cement mixer and dry blended for 1 minute. 15.000 kg of the blended concrete mix was weighed into a plastic pail, and 1.369 kg Troy Michigan city water, that had been tempered to 76° F., was weighed into a container. The pail of concrete mix (15.000 kg) was added to a clean dry mixer, the motor was turned on and approximately ¾ of the pre-measured city water was added and allowed to mix for 2 minutes. The remainder of the water was added and allowed to mix for 1 minute.

The mixed concrete was scooped from the mixer using a plastic cup and poured into a 4"×8", cylindrical mold. The mold was filled ⅓ and then rodded and tapped on the side to release air. This was repeated at ⅔ full and full. A straight edge was used in a sawing action to produce a flat bottom. Three test cylinders (A, B, C) were produced in the same fashion in conformity with ASTM C31-84.

Example 2

Paint Sludge Example

Concrete was made in an identical fashion to example 1 except that the Troy city water was replaced with paint booth sludge taken from a commercial automotive assembly plant.

Curing and Testing

All samples were cured and tested in the same fashion. Initial curing was at 68°–80° F. with mold lids securely closed followed by 28 days at 68°–80° F. with the lids removed. Following cure the concrete cylinders were tested according to ASTM C39-83B.

The test results are provided below.

Tabulated Maximum Stress and Corresponding Strain by Specimen Name

| Specimen Name | Maximum Force | Corresponding Displacement | Maximum Stress | Corresponding Strain |
|---|---|---|---|---|
| 1A | −57154 | 0.0954 | 4,548 | 0.0626 |
| 1B | −61860 | −0.380 | 4,923 | 0.0531 |
| 1C | −59171 | 0.0644 | 4,709 | 0.0566 |
| Avg. City Water | | | 4,727 | 0.0574 |
| 2A | −55293 | 0.0857 | 4,400 | 0.0565 |
| 2B | −55517 | −0.387 | 4,418 | 0.0537 |
| 2C | −56723 | 0.0743 | 4,514 | 0.0532 |
| Avg. Sludge | | | 4,444 | 0.0545 |

Figure 2:
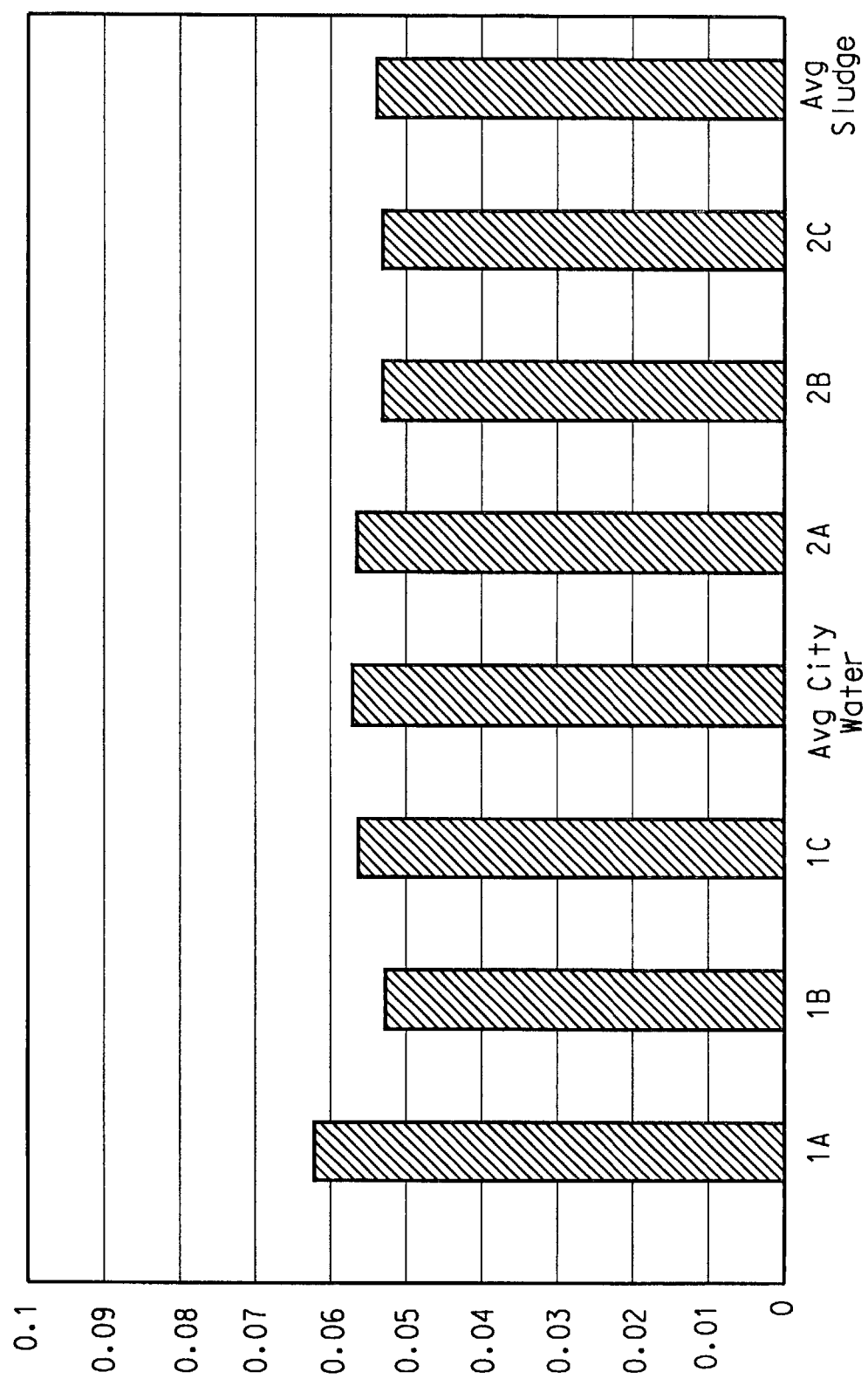
FIG. 2 is a plot showing a comparison of maximum strain of cement made with paint sludge and cement made with city water.

The stress and strain comparisons of the city water bricks to the paint sludge bricks are plotted in FIGS. 1 and 2, respectively.

The above results show that concrete made from Troy, Michigan city water and concrete made from paint sludge have comparable compressive strength and strain results, which are both well above ASTM strength and strain requirements for concrete.

What is claimed is:

1. A process for producing cement, concrete, asphalt, mortar or plaster building materials from liquid paint sludge, comprising:
   a. mixing liquid paint sludge with one of the group consisting of cement mix, concrete mix, asphalt mix, mortar mix, and plaster mix; and,
   b. allowing the mixture to harden, thereby producing a building material therefrom,
   wherein the liquid paint sludge is used directly as a hydrating agent for the building material.

2. The process of claim 1, wherein the liquid paint sludge is used as the principal hydrating agent for the building material.

3. The process of claim 1, wherein the paint sludge comprises between 5% and 60% by weight of paint.

4. The process of claim 1 wherein the liquid paint sludge is mixed directly with cement mix containing quicklime and sand to form cement.

5. The process of claim 1 wherein the liquid paint sludge is mixed directly with mortar mix containing Portland cement and sand to form mortar.

6. The process of claim 1 wherein the liquid paint sludge is mixed directly with concrete mix containing Portland cement, sand, and aggregate to form concrete.

7. The process of claim 6 wherein the concrete is used to make concrete blocks or pre-cast concrete.

8. The process of claim 1 wherein the liquid paint sludge is mixed directly with plaster mix containing dehydrated gypsum to form plaster board.

9. The process of claim 1 wherein the liquid paint sludge is from automotive body or component spray painting operations.

10. The process of claim 1 wherein the liquid paint sludge is derived from water borne or solvent borne paint.

11. The process of claim 10 wherein the liquid paint sludge is collected in troughs containing water beneath a paint booth.

12. The process of claim 11 wherein the liquid paint sludge is produced from overspray from spray painting an automotive body or component thereof in said paint booth.

13. The process of claim 6 wherein the concrete is used in liquid form to fill forms or molds.

* * * * *